(12) United States Patent
West

(10) Patent No.: US 6,427,454 B1
(45) Date of Patent: Aug. 6, 2002

(54) AIR CONDITIONER AND CONTROLLER FOR ACTIVE DEHUMIDIFICATION WHILE USING AMBIENT AIR TO PREVENT OVERCOOLING

(76) Inventor: Michael K. West, 406 Atlantic St. P.O. Box 510504, Melbourne Beach, FL (US) 32951

(*) Notice: Subject to any disclaimer, the term of this patent is extended or adjusted under 35 U.S.C. 154(b) by 0 days.

(21) Appl. No.: 09/498,774

(22) Filed: Feb. 5, 2000

(51) Int. Cl.[7] ............................................. F25D 17/06
(52) U.S. Cl. ........................ 62/93; 62/176.1; 62/176.6
(58) Field of Search ...................... 62/93, 176.1, 176.6, 62/244; 165/227, 228, 252; 236/44 R, 44 A

(56) References Cited

U.S. PATENT DOCUMENTS

| | | | | |
|---|---|---|---|---|
| 2,001,704 A | * | 5/1935 | Bulkeley | 165/252 |
| 2,006,344 A | * | 7/1935 | Bulkeley | 165/252 |
| 4,608,836 A | * | 9/1986 | MacCracken et al. | 62/325 |
| 4,750,545 A | * | 6/1988 | Hile et al. | 165/227 |
| 4,984,433 A | * | 1/1991 | Worthington | 62/90 |
| 5,309,731 A | * | 5/1994 | Nmonoyama et al. | 62/244 |
| 6,079,484 A | * | 6/2000 | Uemura et al. | 62/244 |
| 6,131,653 A | * | 10/2000 | Larsson | 62/176.6 |

* cited by examiner

Primary Examiner—William E. Tapolcai
Assistant Examiner—Mohammad M Ali
(74) Attorney, Agent, or Firm—Joel I. Rosenblatt

(57) ABSTRACT

Dehumidification is achieved using an air conditioning system, by employing an independent humidity control signal to direct ambient air through a heat exchanger and a bypass to the heat exchanger. The air passing through the heat exchanger is dehumidified and mixed with the bypassed air before returning dehumidified air to a controlled space.

49 Claims, 5 Drawing Sheets

AIR CONDITIONER AND CONTROLLER FOR ACTIVE DEHUMIDIFICATION WHILE USING AMBIENT AIR TO PREVENT OVERCOOLING

FIELD OF THE INVENTION

This invention is in the field of air conditioning by refrigeration and in particular to the control of the level of humidity independently of the temperature, while using fresh, return or ambient air from the controlled space to preventing over cooling. The invention provides independent humidity control while preserving as much heat as possible from the inlet air thus limiting sensible cooling relative to latent cooling without using expensive reheat or additional coils.

BACKGROUND

Air conditioning and controls for adjusting the air-conditioning equipment, to achieve a desired comfort zone by controlling the temperature and humidity levels, are well known. Such devices are shown in numerous patents described below. Any such air conditioning system typically uses a chilled fluid or a circulating refrigerant in a heat exchanger coil as a conditioning means to cool and dehumidify air before it is forced into an indoor controlled space. The rate of cooling provided by some systems of this kind, such as chilled fluid systems, is varied in response to a thermostat placed within the indoor space being cooled, with variations occurring in a smooth manner to maintain a chosen temperature level at the thermostat. In other systems, such as split-systems and package units, the air conditioning system compressor turns on and off in response to the thermostat. In recent years, some manufacturers have incorporated humidity sensing into their controls. Humidity control has typically been accomplished through adjustment of the temperature set point or calculation of a comfort condition based on a combined temperature-humidity setting, rather than through a control strategy based on user selectable separate temperature and humidity set points.

It has long been recognized that proper air conditioning systems should not only lower the temperature of the interior space being served when the temperature therein has exceeded a predetermined level but should also control the relative humidity of the space as a function of the air conditioning. During operation of a typical air conditioning system, air from the space to be conditioned is circulated over a heat exchanger. The heat exchanger absorbs heat energy from the air lowering its dry bulb temperature. If the temperature of the air is lowered below its dew point, then moisture from the air is condensed onto the heat exchanger surfaces and the actual amount of moisture contained in the air is reduced.

Most air conditioning systems provide dehumidification passively as a byproduct of cooling. In most systems, the amount of dehumidification delivered by the system is not sensed, controlled, or responsive to the user's needs. Most currently available systems control the amount of cooling delivered by the heat exchanger coil, but not the amount of dehumidification. The space temperature or temperature of a room for example, is maintained within a few degrees of the user's setting, however, the space humidity typically swings up and down, as temperature varies. At times of low load and humid conditions, this swing in humidity can be plus or minus 20% rh resulting in space humidity levels that exceed the maximum comfort levels of 60–70% rh recommended by ASHRAE (American Society of Heating Air-Conditioning and Refrigeration Engineers). Supply duct humidity typically exceeds 90% rh in such systems. The maximum recommended humidity level for supply ducts is 70% rh to prevent fungal growth. These recommended humidity levels are independent of temperature. Present-day air-conditioning system's have not adequately addressed these problems. Excessive energy consumption, complexity, expense, coil freezing, and/or premature compressor failure have confined the practicality of systems that claim to address these problems to specialized applications.

One such system shown in U.S. Pat. No. 5,802,862, which describes a combined, reheat coil runaround system. U.S. Pat. Nos. 4,350,023 and 4,448,597 describe a control scheme for a reheat apparatus that has an additional coil located downstream of the evaporator coil, referred to as a sub-condenser. A similar arrangement is described in U.S. Pat. No. 4,182,133, which uses one coil with multiple circuits, and in U.S. Pat. No. 5,622,057. One of the earliest examples of reheat is described in U.S. Pat. No. 2,451,385, with a variation described in U.S. Pat. No. 2,685,433, in which first cooling and then heating are sequentially provided through separate air streams. By its very nature, heating air after considerable energy has been expended to cool said air is wasteful and results in significantly increased energy expense. The additional heat exchanger coils that are required make such systems expensive to install and more difficult to maintain.

Reheat can be provided with no additional energy expense by exchanging heat from the air entering the coiling coil to the air exiting the cooling coil, as described in U.S. Pat. No. 4,428,205. A current example of this technology is wrap around heat pipes, which significantly increase equipment cost.

U.S. Pat. No. 4,984,433 describes an air conditioning system with a variable sensible heat ratio. The system includes a variable speed supply air fan and a plurality of subcooling coils. The controller senses temperature and humidity and tracks their change over time to predict if the latent and sensible needs will be satisfied simultaneously. When it is desired to remove more latent heat than sensible heat, the supply air fan speed is reduced and subcoolers are activated. This system requires expensive components including a variable speed fan and additional refrigerant coils and solenoids. As with previous inventions of this type, energy waste and the problems of coil freezing and liquid entering the compressor are not solved.

U.S. Pat. No. 3,938,348 describes a unit in which an evaporator coil is maintained at a selected cool or dew point temperature constantly, regardless of whether cooling is required. The compressor is turned on and off, or it is a two-speed, or two compressors are used to constantly maintain the evaporator at a selected temperature. U.S. Pat. No. 5,346,127 describes an air handler arrangement where air flow through the coil is varied, according to the sensible load, via face and bypass dampers.

U.S. Pat. No. 4,485,642 describes a heat exchanger air bypass for humidity control by a manually set damper apportioning the air flowing through the heat exchanger and bypassing the heat exchanger. U.S. Pat. No. 5,303,561 describes a controller that produces a slower fan speed when conditions are humid, based on temperature and humidity sensors. The system modulates the indoor fan speed to attempt to stay within the comfort envelope defined by combined relative humidity and temperature measurements. Other examples are disclosed in U.S. Pat. No. 2,236,058 which describes a variable speed fan; U.S. Pat. No. 2,296, 530 which describes a face damper only; U.S. Pat. Nos. 2,685,433; 3,251,196 which describes three staged fans; and U.S. Pat. No. 4,003,729 which, describes a variable speed fan in conjunction with a coil temperature sensor. U.S. Pat. No. 5,346,129 describes a controller that starts a condensing unit in response to an error signal that is a combination of temperature and humidity. Another combined controller is described as in U.S. Pat. No. 5,850,968, which is a comfort controller replacement for a conventional thermostat.

U.S. Pat. No. 4,105,063 discloses an air conditioning system with a sensor responsive to a predetermined maximum moisture content, operated in parallel with the normal dry-bulb temperature control. U.S. Pat. No. 4,889,280 discloses an auctioning controller wherein the predetermined dry-bulb temperature set point is modified in response to an absolute humidity error signal. Another controller is described in U.S. Pat No. 5,195,473, which operates a system having an HVAC control and a humidity limiting control.

SUMMARY OF THE INVENTION

According to the inventive principles as disclosed in connection with the preferred embodiment, what is shown and described is an air conditioning system and method, including a controller which varies the sensible capacity in relation to the latent capacity to achieve humidity reduction in such a manner as to satisfy separate user selectable temperature and humidity conditions while minimizing the energy consumption of the air conditioning process. At full enhancement, the present invention provides a 64 percent increase in dehumidification capacity over conventional systems, and a concurrent decrease in temperature reduction capacity reduces overcooling and decreases or eliminates the need for expensive reheat. The inventive principles disclosed are comprise an independent humidity setting that controls the level of dehumidification, separation of outside air, ambient and return air at the inlet, a bypass that preserves ambient heat and minimizes use of reheat, and a controller that maximizes energy efficiency.

The system is arranged, according to the inventive principles as disclosed in connection with the preferred embodiment, to prevent freezing of the air conditioning refrigeration equipment and to prevent liquid refrigerant from entering the compressor. More particularly, dehumidification efficiency is achieved according to the inventive principles as disclosed in connection with the preferred embodiment, by using the air flow directing means, such as ducting as would be known to one skilled in the art, and directing a part of the flow of return air from the controlled space or the ambient air, through a bypass which serves to direct the air to a mixing chamber and bypassing the heat exchanger. As would be understood by one skilled in the art, ambient air, according to the inventive principles as disclosed in connection with the preferred embodiment, is from the controlled space. According to the disclosed inventive principles, the bypassed air may be from a source other than the space in which the relative humidity is to be controlled and may include admix of air from other sources or may be ambient air from the controlled space and air from another source. An achievement of the invention is the ability to dehumidify a controlled space responsive to an independent relative humidity indication or signal, separate from a temperature responsive indication or signal. The portion of the ambient air not directed through the bypass, is directed by the airflow directing means or ducting, as would be known to one skilled in the art, to the heat exchanger where the ambient air flow is cooled by its passage through the heat exchanger and then to the mixing chamber where it is mixed with the bypassed air directed through the bypass. According to the inventive principles as disclosed in connection with the preferred embodiment, the part of the ambient air flow directed through the heat exchanger may be mixed with another source of air, such as an outside air flow. If outside air is to be introduced, in the preferred embodiment an adjustable partition divides the intake plenum to separate outside air from ambient air so that mixing does not take place prior to entering the bypass and the heat exchanger. According to the inventive principles as disclosed in connection with the preferred embodiment, the ambient directed to the heat exchanger and the outside air flow directed to the heat exchanger, are divided, until the separate air flows pass the heat exchanger. In this way greater efficiencies are achieved. The mixing chamber of the airflow directing means receives the air from the bypass and the heat exchanger, where mixing occurs and the mixed air is discharged into the controlled space where it is mixed with the space air. As stated, according to the inventive principles as disclosed in connection with the preferred embodiment, by outside air is intended air from a source other than the controlled space ambient and may be two or more such sources separately directed; to said air directing means or mixed in any suitable manner.

The operation of the dehumidification, according to the inventive principles as disclosed in connection with the preferred embodiment, is responsive to an active humidity signal from a controller having a humidity sensor in the ambient air. The controller, as would be known to one skilled in the art, may produce discrete or continuous humidity active or inactive signals, as would be known to one skilled in the art. According to the inventive principles as disclosed in connection with the preferred embodiment, the dehumidification mode operates according to a separate active humidity signal independent of temperature variations or an active temperature signal. In such cases where the temperature of the ambient is reduced below a differential temperature setting and an active humidity signal exists, a heating means may be used to reheat the airflow from the mixing chamber or the bypass of the air directing means. However, as would be known to one skilled in the art, the dehumidifier operating according to the inventive principles as disclosed in connection with the preferred embodiment, provides dehumidification responsive to a separate active humidity signal and independent of the sensed ambient temperature.

Freezing of the condensate on the heat exchanger may be prevented, according to the inventive principles as disclosed in connection with the preferred embodiment, by a temperature sensor responding to the heat exchanger temperature. The controller, responsive to the heat exchanger temperature would then be used to regulate the operation of the bypass regulation means and/or the heat exchanger to raise its temperature, bringing it above the freezing point. Passage of liquid refrigerant into the compressor may be prevented, according to the inventive principles as disclosed in connection with the preferred embodiment, by use of a thermostatic expansion valve in the high pressure refrigerant circuit, made responsive to a the temperature and pressure sensed by a thermostatic expansion sensor placed in the low pressure circuit. Flow of the refrigerant into the heat exchanger may be reduced where the sensed pressure or temperature indicates the risk of refrigerant in the liquid state entering the compressor. A liquid suction heat exchanger, as would be known to one skilled in the art, is used to transfer heat from refrigerant in the high pressure circuit to the refrigerant in the low pressure circuit to heat the low pressure refrigerant and reduce the risk of refrigerant in the liquid state entering the compressor while increasing the subcooling of the high pressure refrigerant. However, as would be understood to one skilled in the art, the invention is not limited to any one heat exchanger but any suitable heat exchanger may be used.

In the operation of a preferred embodiment, according to the inventive principles, ambient air through the return duct or fresh outside air, or a mixture of returned and outside air, is introduced into the air conditioning system and directed over the air conditioning refrigeration equipment's evaporator coil heat exchanger or the heat exchanger in a chilled liquid system, for example, and into a bypass duct or passage extending around the conditioning refrigeration equipment. An output mixing plenum for mixing air flowing from the air conditioning equipment's heat exchanger with the air flowing from the bypass duct or passage, is located downstream of the bypass duct and the air conditioning refrigeration equipment. A fan(s) is placed to move air into the bypass duct and over the air conditioning equipment, and a damper regulates the flow of air into the bypass duct relative to the flow of air through the heat exchanger. According to the inventive principles as disclosed in connection with the preferred embodiment, the fan(s) may be single, staged, variable or multi speed.

As stated above and according to the inventive principles as disclosed in connection with the preferred embodiment, control over the level of humidity is achieved independently of temperature by the operation of the system to cool some of the intake air drawn into the system while directing the other part of the intake air around the air conditioning heat exchanger through a bypass duct. The amount of air directed through the air conditioning, relative to the amount of air directed through the bypass, is regulated so the air directed into the output mixing plenum from the air conditioning equipment and the bypass duct will provide a comfortable temperature within the setting of the temperature control while the humidity is reduced to a level within the setting of the independent humidity control. An air flow regulation means is used to vary the operation of the conditioning means by adjusting the air flow to provide a relatively high level of air flow through the bypass duct or passage in relation to the air flow through the air conditioning means. In this way, the air from the air conditioner means is mixed with the air to the bypass to reduce the temperature of the bypassed air and reduce its humidity, which is then directed to a controlled space where it is mixed again with ambient air and raised to a desired temperature level and reduced humidity level. The reduction in humidity is achieved by the passage of air through the air conditioning heat exchanger. The relative humidity of the ambient air through the bypass is reduced when mixed with the air cooled and dehumidified by the air conditioner hear exchanger. At the same time, the temperature of the air-conditioned dehumidified air is raised. Then the mixed air from the mixing chamber is introduced into the controlled space, reducing the relative humidity in the controlled space. Where required to provide relatively high levels of air cooling in relation to air dehumidification in order to satisfy user set points and maximize energy efficiency, the system control and regulation means varies operation of the conditioning means while setting the airflow regulation means to a state providing a relatively low level of air flow through the bypass duct or passage in relation to the air flow through the conditioning means. In systems that use a dual or multiple speed blower(s), a lower blower speed is selected when the airflow regulation means provides higher levels of airflow through the bypass duct to assist in the process.

As stated above and according to the inventive principles as disclosed in connection with the preferred embodiment, liquid refrigerant is prevented from entering the compressor, of concern when the airflow through the bypass duct is increased and the airflow through the air conditioning equipment is reduced. According to the inventive principles, an adjustable or electronic thermostatic refrigerant expansion valve (TXV) is used to ensure that the refrigerant is fully evaporated upon exiting the evaporator heat exchanger coil. A liquid-suction heat exchanger is used to provide subcooling of the refrigerant as it flows from the condenser to the expansion valve and superheating of the refrigerant as it flows from the evaporator heat exchanger to the compressor. To prevent the accumulation of ice on the evaporator heat exchanger coil, the controller responds to the temperature of the coil to vary the operation of the air conditioning equipment, fan and/or airflow regulation means.

In summary, using known systems the removal of heat for the sole purpose of dehumidification was not possible with systems relying upon existing temperature-based humidity controls or comfort range controllers. In these systems excessive overcooling of the space and/or equipment failure would occur, requiring energy expensive reheat or additional costly components. With the invention, which functions as a system, more dehumidification is provided with little or no overcooling and reheating. This reduces or eliminates the need to overcool and then reheat or rely upon a comfort-zone temperature and humidity combination since temperature and humidity are user selectable and controlled separately. The invention provides independent humidity control while preserving as much sensible heat as possible from the inlet air when needed, thus limiting sensible cooling relative to latent cooling without using reheat or additional coils, thereby maximizing energy efficiency.

DETAILED DESCRIPTION OF THE PREFERRED EMBODIMENT

Figure 1:
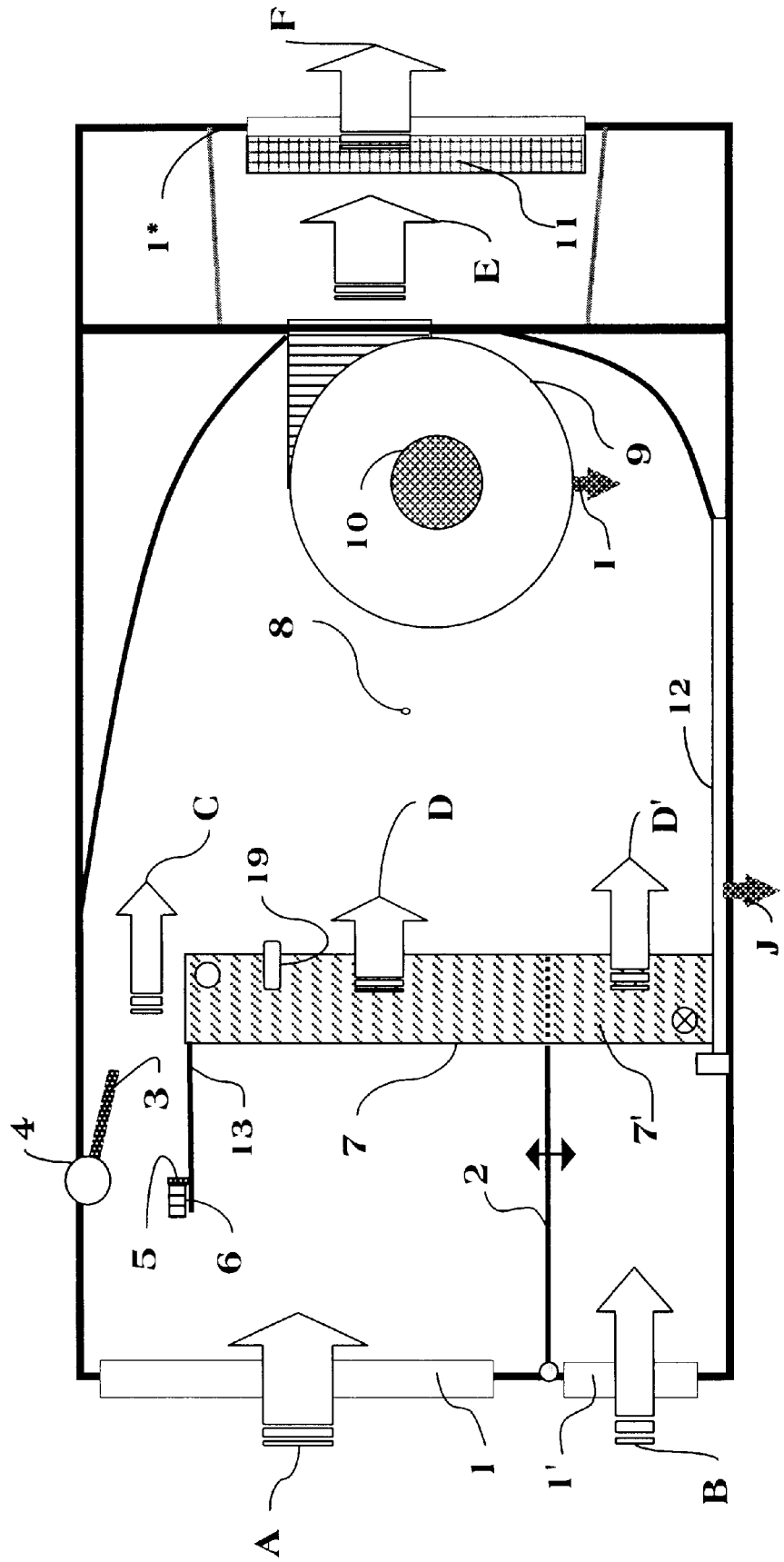
FIG. 1 is a view of an embodiment of the structure of an air conditioning unit.
Figure 7:
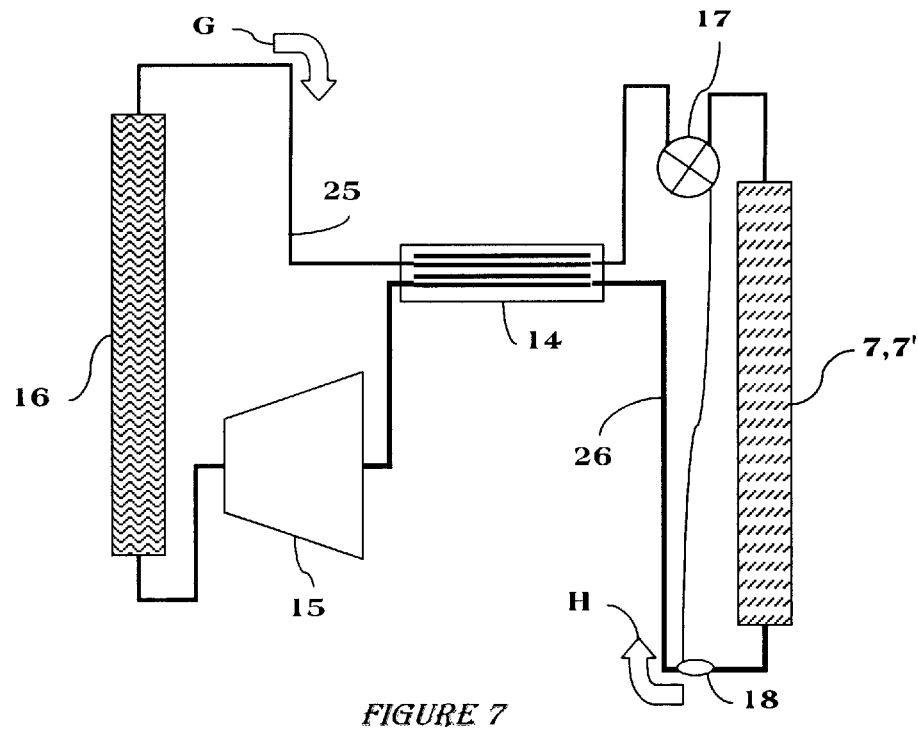
FIG. 7 is a schematic diagram of the refrigeration components of an embodiment of a direct expansion type system, as would be used in connection with the heat exchange coil shown in FIG. 1.

FIG. 1 is a view of an embodiment of the structure of an air conditioning unit, according to the inventive principles as disclosed in connection with the preferred embodiment, according to the present invention. Return air from the controlled space or ambient air flows along path A through filter 1, and air from outdoors flows along separated path B through filter 1'. According to the inventive principles as disclosed in connection with the preferred embodiment, the return air A or ambient air and outside air flows B, are prevented from mixing by adjustable partition 2 which directs the outside air flow through separate section heat exchanger sections 7 and 7'. In this way the efficiency of the dehumidification is improved. According to the inventive principles as disclosed in connection with the preferred embodiment, the two sections of the heat exchange coil 7 and 7', may or may not be similar in construction, depth, and/or fin spacing and arrangement. Heat exchange coil 7 and 7' may be cooled by circulating refrigerant as shown in FIG. 7 or it may be cooled by chilled liquid, as would be known to those skilled in the art. Ambient or return air also flows past damper 3 along path C, separated from air paths A and B and is mixed with the air exiting along paths D in output mixing plenum 8. Fan 9 is driven by fan motor 10, which may be single speed, multi-speed, or variable speed and is energized in response to a command from microprocessor 20 of FIG. 6 via the control unit and wiring G and GY on terminal strip 21. Damper 3 positioning may be achieved by (i) motorized damper actuator 4, or (ii) damper 3 may be weighted and balanced so that the flow of air along path C provides sufficient force against the damper to keep it open, such as in the case of a barometric damper. A weighted and balanced damper moves to the closed position resting against damper seat 5 when fan 9 stops turning, and is maintained in this position by electromagnetic latch 6 that is energized in response to a command from microprocessor 20 of FIG. 6 via the control unit and wiring V on terminal strip 21. Damper actuator 4, if used, is energized in response to a command from microprocessor 20 of FIG. 6 via the control unit and wiring V on terminal strip 21. Water vapor in the outside and return air is condensed in coil 7, 7' and plenum 8 and is collected in condensate collection pan 12. Air exiting fan 9 along path E flows past heating coil 11 which may be energized in response to a command from microprocessor 20 of FIG. 6 via the control unit and wiring W1 and W2 on terminal strip 21 and this air flows to the space along path F.

A counterweight (not shown), attached to a torque arm counteracts the gravitational and frictional effects of the damper blade 3 so that the blade is substantially weightless. The barometric damper has a counterweight assembly which is not shown and as would be known to one skilled in the art, that can be adjusted to set the static pressure control point of the damper. The weight and torque arm length setting provides the desired airflow. Preferably, the counter-torque exerted by the weight-arm-linkage assembly is independent of the angular orientation of the damper blade. With the fan on and the damper held in the closed position, there exists a static pressure difference across the damper blade. With the damper released, this difference in static pressure tends to cause the blade to swing in the direction of lower static pressure, since the forces on each face of the blade are unequal. As the blade swings open, the static pressure across the damper tends to equalization, thereby decreasing the differential force on the blade so that the blade rests in a position where the differential force caused by the static pressure difference due to the pressure drop across the blade is exactly equaled by the force on the blade caused by the counterweight and torque arm. A subsequent change in the static pressure due to a change in fan speed will cause the damper blade to move and rest in a new position as follows; the damper will open further as the fan speed is increased, until it is fully open, and the damper will tend to close as the fan speed is decreased until the fan is stopped and the damper rests in the fully closed position. In this manner, the proportion of the air that flows past damper 3 along path C and that which flows past heat exchange coil 7, 7', is maintained as the airflow through speed of fan 9 changes.

According to the inventive principles as disclosed in connection with the preferred embodiment, the air flow through the bypass relative to the air flow of ambient or ambient and outside air through the heat exchanger can be varied by placing an air moving means in any part of the air directing means or ducting or by placing a damper in the any part of the air moving means or ducting. As would be known to one skilled in the art, the fan 9 may be placed in any suitable location for achieving air flow without departing from the inventive principles and the controller 20 may produce a fan control signal as a continuous signal or in one more discrete signals.

Figure 2:
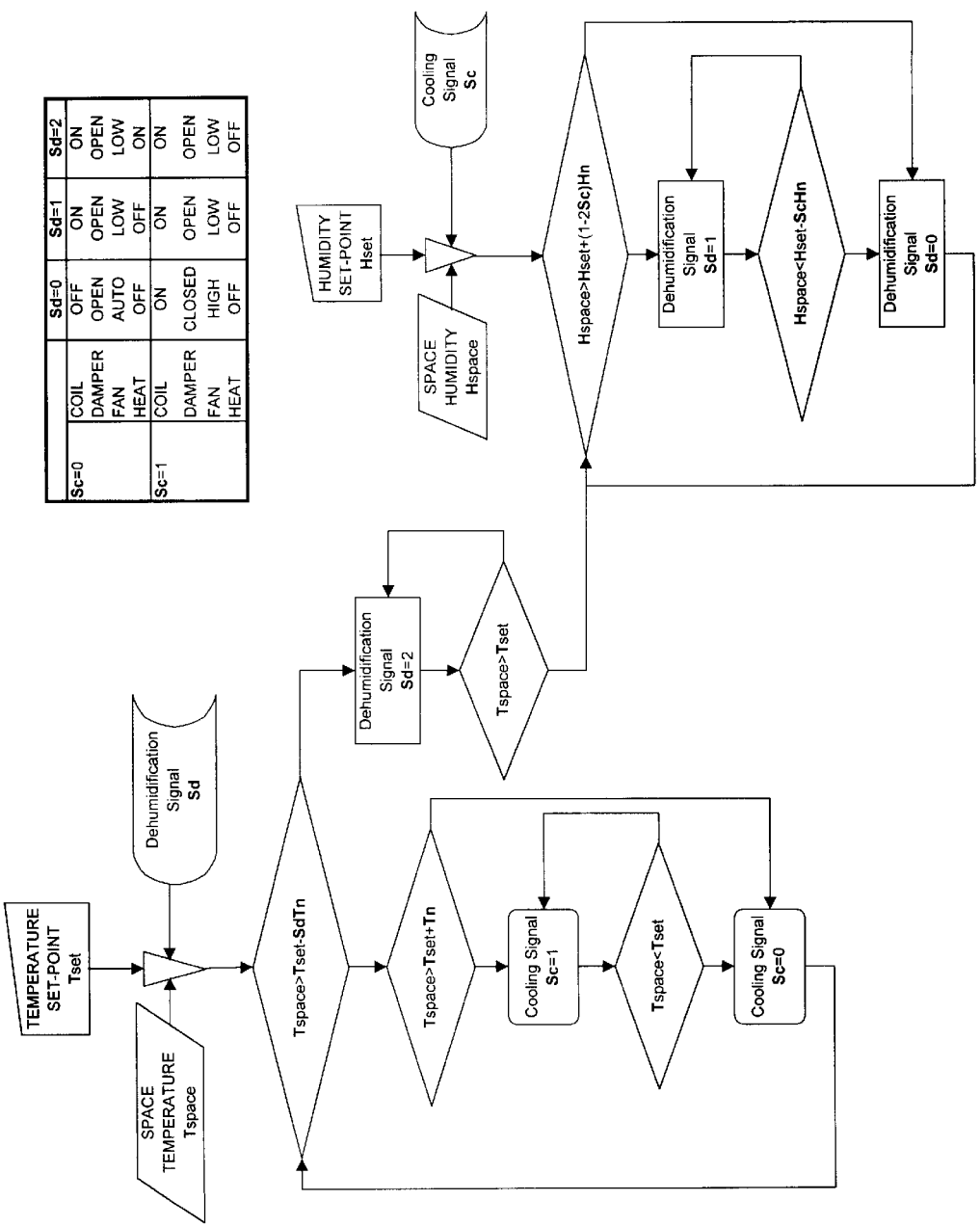
FIG. 2 is a flowchart of the control sequence for use of the air conditioning unit of FIG. 1, when applied to control of a direct expansion type system such as a split-system or packaged unit.
Figure 3:
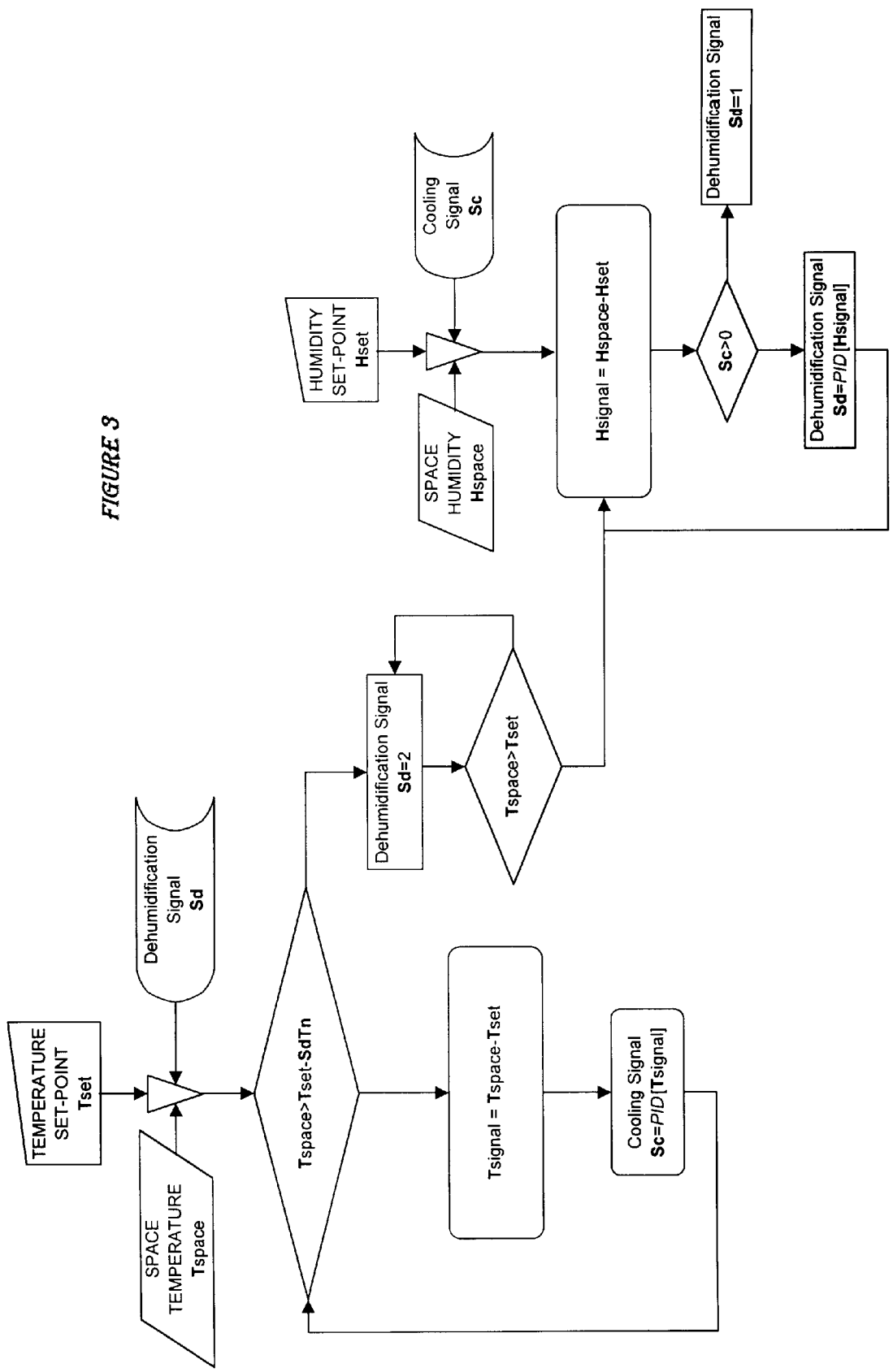
FIG. 3 is a flowchart of another embodiment of the control sequence for use of the air conditioning unit of FIG. 1, when applied to a chilled water system.

FIG. 2 is a flowchart of the control sequence according to the inventive principles when applied to control of a direct expansion type system such as a split-system or packaged unit, and FIG. 3 is a flowchart of another embodiment of the control sequence according to the inventive principles when applied to proportional type system such as a chilled water system for example. The principles of the disclosed invention are not limited to the particular air conditioning system and may be practiced with the systems shown or any other cooling system. According to the inventive principles as disclosed in connection with the preferred embodiment, the humidity and temperature are independently measured by separate and independent respective humidity and temperature sensors via signals Hspace and Tspace, conveyed as respective active or inactive signals by the controller 20, shown in FIG. 6. According to the inventive principles as disclosed in connection with the preferred embodiment, any suitable humidity sensor such as would be known to one skilled in the art may be used such as a sensor using a humidity sensitive polymer on a porous ceramic plate. The operation of one such a humidity sensor is independent of temperature and depends on the resistively of the polymer changing as a function of relative humidity. In the case this sensor, the polymer capacitate moisture sensitive element is formed by sequentially stacking a lower electrode, a moisture sensitive film made of an organic polymer resin material, and an upper electrode on an insulating substrate. Another type of humidity sensitive device employs a capacitor with an air dielectric. Since the dielectric constant of air is one and the dielectric constant of water is about 80, changes in the relative humidity between the capacitor plates changes the dielectric, and, hence, the capacitance of the sensor. The changes in capacitance can be used in a number of ways in circuits to provide an electrical output that is indicative of the relative humidity. Electrical components may be susceptible to changes in temperature and their nominal values may drift accordingly. Thus, the sensor unit typically includes a voltage divider network that compensates for changes in temperature, which may have an effect on the nominal values of circuit elements, thus making the sensor responsive to humidity only and not to temperature. However, as would be understood by those skilled in the art, the invention and the inventive principles are not limited to the particular type of relative humidity sensor chosen.

As stated above, FIG. 2 is a flowchart of the control sequence according to the inventive principles as disclosed in connection with the preferred embodiment, when applied to control of a direct expansion type system such as a split-system or packaged unit with a stand-alone controller, and FIG. 3 is a flowchart of another embodiment of the control sequence according to the inventive principles as disclosed in connection with the preferred embodiment, when applied to modulating type system such as a chilled water system with a stand-alone controller.

Figure 6:
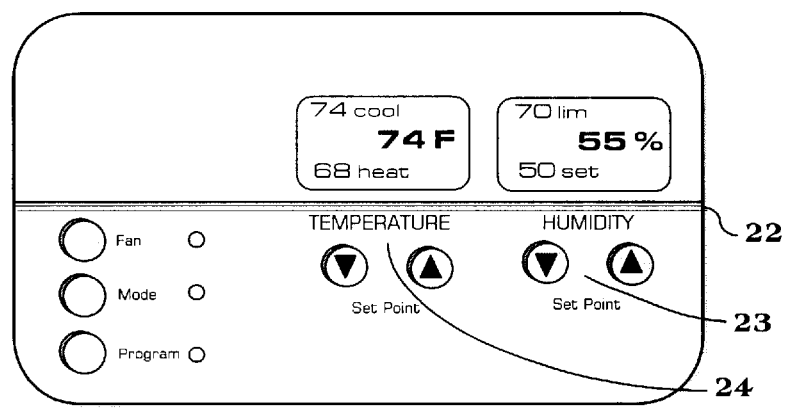
FIG. 6 is a view of an embodiment of user selectable temperature and humidity set point controls and connections of a control unit according to the invention.
Figure 6:
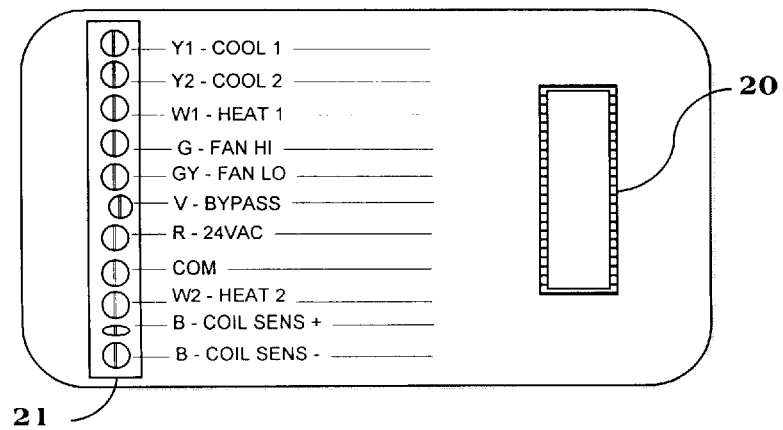

As shown in FIG. 2. discrete inactive and active humidity signals, Sd=0 and Sd=1, respectively, and inactive and active temperature signals, Sc=0 and Sc=1, respectively, are produced by the programmable logic controller, computer, and/or as shown in FIG. 3, a direct digital control (DDC) system instead of or in addition to a stand-alone controller microprocessor to execute the control sequence and PID or P-adaptive logic software functions, and as represented by numeral 20 in FIG. 6. Each of the discrete signals may be used to turn on or off the heat exchange coil 7, 7', open or close the damper 3, turn the fan 9, on or off, or turn the heating coil 11 on or off. The controller 20, may be arranged to produce such discrete signals at multiple levels, such as Sd=2, for example when the relative humidity is above a critical level requiring the heat exchange coil 7, to operate for an extended period and reducing the mixed air flow temperature below a critical level, requiring reheating to raise it to a comfortable level. As shown, the active humidity signal Sd=1 is produced separately or independently from the active temperature control signal Sc=1 and the heat exchange coil 7, 7', is operable, according to the inventive principles to dehumidify the intake air flow shown as the return air flow A and fresh air flow B. According to the inventive principles as disclosed in connection with the preferred embodiment, room temperature Tspace may be sensed by an integrated resistive type sensor having a current output proportional to temperature, and room humidity Hspace may be separately and independently sensed by an integrated capacitive type sensor having a current output proportional to relative humidity. Temperature set point Tset and humidity set point Hset are user selectable as shown in FIG. 6. Microprocessor 20 of FIG. 6 is programmed to execute the control sequence logic of FIG. 2 or of FIG. 3 depending on the type of system being controlled and provide output command signals at terminal strip 21, which are produced by the Controller shown in FIG. 6, via separate and independent dehumidification signals Sd, and temperature signal Sc. The variables Tn and Hn are offset values that define a control operating differential, or deadband, the purpose of which is to prevent short cycling. When cooling is not needed as determined by the control logic the cooling signal Sc is equal to zero, and when full cooling is needed Sc is equal to the value one. When dehumidification is not needed as determined by the control logic the dehumidification signal Sd is equal to zero, and when full dehumidification is needed Sd is equal to the value one. Additional dehumidification relative to cooling is achieved as Sd increases beyond the value one to a value of two, energizing heating coil 11.

The capability for reheat is shown in the embodiment to allow for the condition whereby Sd=2 triggers heat, in response to a critically high humidity in conjunction with a critically low temperature. Connection between temperature and humidity control loops is provided merely to trigger the recalculation of the dehumidification signal Sd, based on humidity alone. The invention greatly reduces the need for reheat, but under particular conditions it may not entirely eliminate the need. Reheat can only be activated when there is a need for dehumidification. Simply put, following the process in FIG. 2, if the value Sd=2 is not or no longer needed, Sd is calculated solely on the basis of humidity. The embodiment of the system optimizes both temperature and humidity in accordance with the general purpose of an air conditioning system. The active dehumidification signals are determined by humidity; the dehumidification output of control wiring V on terminal strip 21 is proportional to Sd, and the output of control wiring Y is proportional to Sc and is maximum whenever Sd is greater than zero. The interaction of the separate temperature and humidity control signals, as shown in FIGS. 2 and 3 is ancillary to the inventive principles and is not necessary to the invention disclosed of bypassing a part of the return ambient air from a controlled space, around a cooling heat exchanger while directing a lesser part of the ambient air through the cooling heat exchanger to achieve dehumidification with minimal effect on the temperature of the controlled space.

The distinguishing feature of the control processes of FIG. 2 versus that of FIG. 3 is integer (two-position) versus continuous (modulating) values of Sc and Sd, whereby via FIG. 2 these outputs are limited to the whole values of 0, 1, and 2 and where via FIG. 3 these outputs can take any value between 0.0 and 2.0 to provide proportional, integral, and/or derivative (PID) or P-adaptive control. With two-position control, the system components are controlled as shown in the logic diagram of FIG. 2. With proportional (P) control the magnitude of control signals Sc and Sd are based on the offset, which is the difference between Tspace and Tset and Hspace and Hset; with proportional-integral control (PI) the signals are based on the offsets and the length of time the offsets have existed, which is the offset integrated over time. With proportional-integral-derivative control (PID) the signals are based on the offset, the integrated offset, and the rate at which the offset is changing which is the time derivative of the offset. In this manner, the control logic sets the amount of cooling provided by coil 7, 7', the amount of heating provided by coil 11, the position of damper 3, and the speed of fan 9 to vary the amount of sensible cooling relative to latent cooling in order to satisfy the user selectable temperature set point and humidity set point quickly while consuming minimum energy.

According to the inventive principles as disclosed in connection with the preferred embodiment, the operation of the system may be discrete or proportional with all of the operating parts made to respond to discrete signals or proportional signals, as would be known to one skilled in the art. A general purpose computer arranged to receive the Tspace and Tset and Hspace and Hset, indications, such as for example electrical signals, and/or carry out the control sequence and logic software could be used as would be known to one skilled in the art, or a dedicated or proprietary DDC system could be used, as would be known to one skilled in the art.

Figure 4:
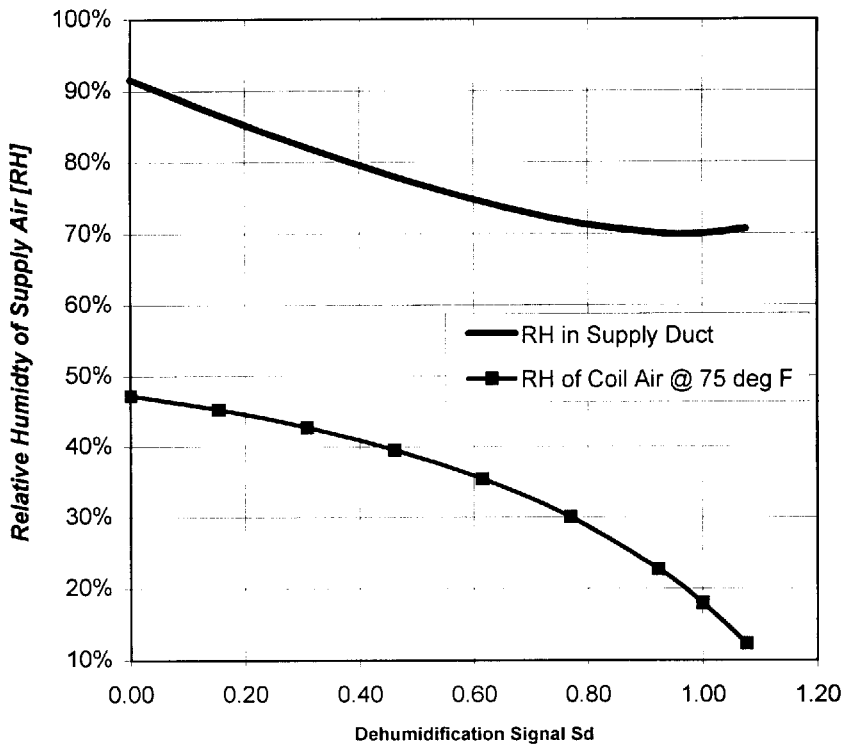
FIG. 4 shows the reduction in the relative humidity of conditioned air produced according to the invention as the dehumidification signal, as shown in FIG. 3, is varied.
Figure 5:
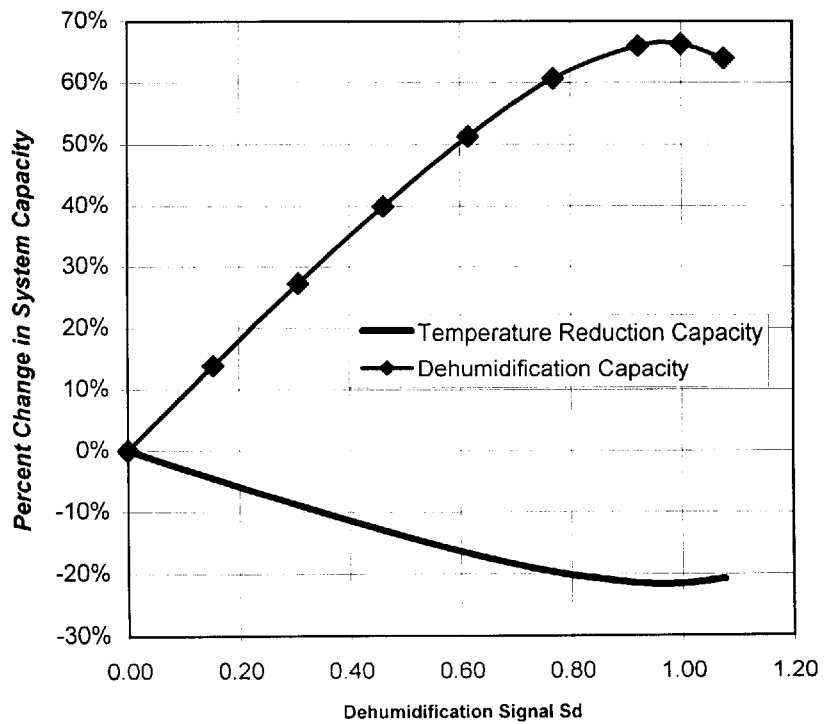
FIG. 5 shows the relatively large increase in dehumidification capacity as compared with the decrease in temperature reduction capacity achieved according to the inventive principles disclosed.

FIG. 4 shows the reduction in the relative humidity of conditioned air produced according to the invention as the dehumidification signal from the controller is varied. The abscissa shows the dehumidification signal that increases in value from 0.0 as more dehumidification is needed. The ordinate shows the relative humidity of the supply air flow at path F of FIG. 1, the data labeled RH in Supply Duct; and the relative humidity of that air upon discharge into the space and being warmed to space temperature, the data labeled RH of Coil Air @ 75 deg F. As the dehumidification signal of FIG. 3, is increased, the relative humidity of the air conditioned by the system decreases, providing increased moisture removal relative to reduction in temperature. The data corresponds to an average coil inlet psychometric condition of 75 degrees Fahrenheit, 55 percent relative humidity, 63.9 degrees Fahrenheit wet-bulb, and 71.5 grains of water per pound of dry air. FIG. 5 shows the relatively large increase in dehumidification capacity and the decrease in temperature reduction capacity according to the present invention. The abscissa again shows the dehumidification signal, as in FIG. 4, that increases in value from 0.0 as enhanced dehumidification is needed. The ordinate shows the percent change in system capacity relative to a conventional system, that is, a system with no enhanced dehumidification and Sd being zero. At full dehumidification, the present invention provides a 64 percent increase in dehumidification capacity over conventional systems. Furthermore, the concurrent decrease in temperature reduction capacity makes it less likely that the space will be overcooled and decreases or eliminates the need for expensive reheat as compared with currently available systems.

FIG. 6 is a view of an embodiment of user selectable temperature and humidity set point controls and connections of a Controller according to the invention. The Controller includes a control panel 22 and a microprocessor and wiring terminal 21. Any suitable controller, employing a microprocessor, DDC system, or a general purpose computer arranged and operating according to the inventive principles and as would be known to one skilled in the art, may be used. According to the inventive principles as disclosed in connection with the preferred embodiment, the temperature set point and the humidity set point are independently adjustable by the user. The control unit contains or has provision for connection of temperature and humidity sensors, circuitry and microprocessor 20 to carry out the control sequence of either FIG. 2 or FIG. 3, and a connection terminal 21 for transmitting signals to the system and receiving a temperature signal from coil temperature sensor 19 of FIG. 1. When the signal from sensor 19, terminals B+ and B−, indicates, for example, that the coil temperature is below the freezing point of water and remains as such for a pre-programmed period of time the controller will reduce or interrupt the cooling means of heat exchange coil 7, 7', and/or adjust damper 3 until the coil temperature rises above the freezing point of water by a pre-programmed number of degrees. In the case of a direct expansion system, cooling means adjustment is achieved by unloading or turning off one or more compressors and in the case of a chilled fluid system this is achieved by reducing or interrupting the flow of chilled fluid.

FIG. 7 is a schematic diagram of the refrigeration components of an embodiment of a direct expansion type system according to the present invention. As air flows along paths A and B of FIG. 1 and past heat exchange coil 7, 7', refrigerant in the coil evaporates thus absorbing its latent heat of vaporization from the air thus cooling the air. The reference to the heat exchange coils 7, 7' is used for consistency with FIG. 1. This refrigerant vapor exits coil 7, 7', along refrigerant flow path H and enters the low pressure circuit of liquid-suction heat exchanger 14 where heat is transferred to flow H from the liquid refrigerant flow G, vaporizing any remaining liquid in flow H and superheating it. The superheated refrigerant vapor then enters compressor 15 where its pressure and temperature are increased, and then flows through heat rejection coil 16 where it partially or fully condenses from a superheated vapor into a saturated or sub-cooled liquid, releasing the heat absorbed in heat exchange coil 7, 7', exchanger 14, and compressor 15. The refrigerant flows along path G into the high pressure circuit of liquid-suction heat exchanger 14 where it is further condensed and/or subcooled by way of the transfer of heat to refrigerant along path H and into same heat exchanger 14. Refrigerant then enters the thermostatic expansion valve (TXV) 17 where its pressure and temperature are reduced by throttling. The TXV 17 meters the flow rate of refrigerant into coil 7 according to the refrigerant pressure and the temperature sensed by TXV sensor 18 so that the flow rate, and thus the pressure, is reduced when refrigerant flow H is not sufficiently superheated, and the flow rate is increased as the TXV superheat setting is satisfied. The combination of (i) the TXV with a lower than conventional superheat setting 17 and (ii) the liquid suction heat exchanger 14 serve to provide lower average coil temperature, and thus increased dehumidification and energy efficiency and decreased risk of liquid refrigerant entering the compressor compared with currently available systems. According to the inventive principles as disclosed in connection with the preferred embodiment, the effects of reduced heating of the heat exchange coil 7, 7', in response to dehumidification signal Sd, independently of temperature signal Sc, may increase the risk of freezing condensate on the coil or refrigerant in a liquid state entering the compressor and causing damage. A suction-liquid heat exchanger as would be known to one skilled in the art such as for a heat pump may be provided by utilizing an inner vessel as a suction line accumulator together with a surrounding high pressure outer vessel which is utilized as a receiver in the liquid line. Heat from the liquid refrigerant in the outer vessel is transferred to the cooler liquid accumulated in the inner vessel to vaporize it, preventing liquid refrigerant from entering the compressor. The exit and entry ports of the outer vessel are at different levels. This causes a greater amount of liquid refrigerant to remain in the outer vessel on heating mode operation than on reverse flow for cooling, thereby increasing the heat transfer to the accumulator as required for the greater volume of liquid in the suction line gas and compensating for the decreased quantity of refrigerant needed for heating.

The controller 20 may be any general or special purpose computer, DDC CPU, or data processor as would be known to those skilled in the art.

The invention has been described herein with reference to one particular embodiment thereof. It is to be understood by those skilled in the art that variations and modifications can be effected within the spirit and scope of the invention.

What is claimed is:

1. An air conditioning system for humidity control, comprising, a means for cooling;

a means for directing an air flow to said means for cooling and to a bypass to said means for cooling, and to a mixing means for mixing said air flow to said means for cooling and to said bypass;

a means for controlling connected to said means for cooling and said means for directing an air flow, for producing an active or inactive humidity signal responsive to a change in relative humidity in relation to a humidity setting, for controlling said means for cooling and said means for directing an air flow;

said means for directing an air flow, increasing said air flow to said bypass relative to said air flow to said cooling means, in response to said active humidity signal.

2. The system of claim 1, wherein said means for cooling, responsive to said active humidity control signal, cools said air flow to said cooling means.

3. The system of claim 1, wherein, said means for controlling produces an active or inactive temperature signal responsive to a change in temperature; and said means for cooling, cools said air flow to said cooling means, in response to said active temperature signal.

4. The system of claim 3, wherein,
said humidity signal is independent of said temperature signal and said means for directing an air flow increases said air flow to said bypass relative to said air flow to said cooling means, in response to said active humidity signal and when said temperature signal is inactive.

5. The system of claim 1, wherein, said means for directing an air flow includes a means for damping for increasing said air flow to said bypass relative to said air flow to said cooling means, in response to said active humidity signal.

6. The system of claim 5, wherein said means for damping includes a barometric damper and a fan connected to said controller; and said controller operating said fan to open said damper in response to said active humidity signal.

7. The system of claim 1, wherein said active humidity signal is a proportional signal responsive to said change in relative humidity relative to said humidity setting and wherein, said means for controlling produces a proportional control signal for varying the speed of said fan in response to said active humidity signal.

8. The system of claim 1, wherein, said means for directing an air flow includes means for directing an ambient air flow from a controlled space to said bypass.

9. The system of claim 1, wherein said means for directing an air flow includes means for directing an ambient air flow to said cooling means and an outside air flow to said cooling means and for separating said ambient air flow from said outside air flow.

10. The system of claim 1, including means for heating said mixed air flow.

11. The system of claim 5, wherein, said means for damping includes means for regulating for regulating said damping means.

12. The system of claim 5, wherein, said means for damping includes means for latching said means for damping in a closed position when said humidity signal is inactive.

13. The system of claim 11, wherein, said means for regulating includes means for regulating said damping means for varying said air flow.

14. The system of claim 13, wherein said means for regulating includes means for regulating said damping means for varying said air flow continuously.

15. The system of claim 1, wherein, said means for controlling includes means for producing a discrete humidity signal.

16. The system of claim 1, wherein, said means for controlling includes means for producing a continuous humidity signal.

17. The system of claim 1, wherein said cooling means comprises a high and low pressure circuit; and
a liquid suction heat exchanger means for transferring heat from high pressure circuit to said low pressure circuit for heating the refrigerant in said low high pressure circuit;
a thermostatic expansion sensor means for sensing the pressure and temperature, placed in said low pressure circuit; and
a thermostatic expansion valve means placed in the high pressure circuit and connected to said thermostatic expansion sensor means for metering the flow rate of said refrigerant into said liquid suction heat exchanger means in response to the refrigerant pressure and the temperature sensed by said thermostatic expansion sensor means.

18. The system of claim 1, wherein said means for cooling includes a temperature sensor means connected to said means for cooling and to said means for controlling for increasing the temperature of said means for cooling in response to an indication of freezing condensate.

19. The system of claim 17, wherein,
said thermostatic expansion valve means reduces the flow rate of said refrigerant in response to said thermostatic expansion sensor means indicating a temperature of said refrigerant in said low pressure circuit below that indicative of complete evaporation of said refrigerant.

20. The system of claim 14, wherein said means for regulating includes a motor for opening and closing said damping means in response to said active humidity signal.

21. In an air conditioning system for cooling ambient air or ambient and outside air for dehumidifying a controlled space, a dehumidifying system, comprising,
a means for cooling;
a means for directing an air flow to said means for cooling and to a bypass for bypassing said means for cooling and to a mixing means for mixing said cooled air flow and said bypassed air flows;
a means for controlling connected to said means for cooling and said means for directing an air flow and for producing an active or inactive humidity signal responsive to a change in relative humidity in relation to a humidity setting, for controlling said cooling means and said air flow means;
said means for directing an air flow, increasing said air flow to said bypass relative to said air flow to said cooling means, in response to said active humidity signal;
said means for cooling, responsive to said active humidity control signal, cooling said air flow to said cooling means;
said means for controlling producing an active or inactive temperature signal responsive to a change in temperature in relation to a temperature setting; and
said humidity signal is independent of said temperature signal and said means for directing an air flow, increases said air flow to said bypass relative to said air flow to said cooling means, in response to said active humidity signal and when said temperature signal is inactive.

22. A method for dehumidification, comprising the steps of,
directing an air flow to a means for cooling, and to a bypass to said means for cooling, and to a mixing means for mixing the air flow to said means for cooling and the said bypass;
controlling said means for cooling and said means for directing an air flow, in response to an active or inactive humidity signal indicative of a change in relative humidity; and
increasing said air flow to said bypass relative to said air flow to said cooling means, in response to said active humidity signal.

23. The method of system of claim 22, including the step cooling said air flow to said cooling means in response to said active humidity signal.

24. The method of claim 22, including the step of, producing an active or inactive temperature signal responsive to a change in temperature in relation to a temperature setting; and
cooling said air flow to said cooling means, in response to said active temperature signal.

25. The method of claim 24, including the step of producing said humidity signal independent of said temperature signal and for directing said air flow, to increase said air flow to said bypass relative to said air flow to said cooling means, in response to said active humidity signal and when said temperature signal is inactive.

26. The method of claim 22, including the steps of directing an ambient air flow to said cooling means and an outside air flow to said cooling means and separating said ambient air flow from said outside air flow.

27. The method of claim 22 including the step of varying said air flow.

28. The method of claim 22 including the steps of,
transferring heat from high pressure circuit to said low pressure circuit for heating the refrigerant in said low high pressure circuit;
sensing the pressure and temperature, and
metering the flow rate of said refrigerant into said heat exchanger in response to the refrigerant pressure and the temperature sensed by said thermostatic expansion sensor.

29. An air conditioning system for humidity control, comprising,
a means for cooling;
a means for directing an air flow to said means for cooling and to a bypass to said means for cooling, and to a mixing means for mixing said air flow to said means for cooling and to said bypass;
a means for controlling connected to said means for cooling and said means for directing an air flow, for producing an active or inactive humidity signal responsive to a change in relative humidity in relation to a humidity setting, for controlling said means for cooling and said means for directing an air flow;
said means for directing an air flow, increasing said air flow to said bypass relative to said air flow to said cooling means, in response to said active humidity signal; and wherein,
said active humidity signal is a proportional signal responsive to said change in relative humidity relative to said humidity setting and said means for controlling produces a proportional control signal for varying the speed of said fan in response to said active humidity signal.

30. An air conditioning system for humidity control, comprising,
a means for cooling;
a means for directing an air flow to said means for cooling and to a bypass to said means for cooling, and to a mixing means for mixing said air flow to said means for cooling and to said bypass;
a means for controlling connected to said means for cooling and said means for directing an air flow, for producing an active or inactive humidity signal responsive to a change in relative humidity in relation to a humidity setting, for controlling said means cooling and said means for directing an air flow;
said means for directing an air flow, increasing said air flow to said bypass relative to said air flow to said cooling means, in response to said active humidity signal; and wherein,
said means for directing an air flow includes means for directing an ambient air flow to said cooling means and an outside air flow to said cooling means and for separating said ambient air flow from said outside air flow.

31. An air conditioning system for humidity control, comprising,
a means for cooling;
a means for directing an air flow to said means for cooling and to a bypass to said means for cooling, and to a mixing means for mixing said air flow to said means for cooling and to said bypass;
a means for controlling connected to said means for cooling and said means for directing an air flow, for producing an active or inactive humidity signal responsive to a change in relative humidity in relation to a humidity setting, for controlling said means cooling and said means for directing an air flow;
said means for directing an air flow, increasing said air flow to said bypass relative to said air flow to said cooling means, in response to said active humidity signal;
said means for directing an air flow includes a means for damping for increasing said air flow to said bypass relative to said air flow to said cooling means, in response to said active humidity signal; and wherein,
said means for damping includes means for latching said means for damping in a closed position when said humidity signal is inactive.

32. A method for dehumidification, comprising the steps of,
directing an air flow to a means for cooling, and to a bypass to said means for cooling, and to a mixing means for mixing the air flow to said means for cooling and the said bypass;
controlling said means for cooling and said means for directing an air flow, in response to an active or inactive humidity signal indicative of a change in relative humidity;
increasing said air flow to said bypass relative to said air flow to said cooling means, in response to said active humidity signal; and
the steps of directing an ambient air flow to said cooling means and an outside air flow to said cooling means and separating said ambient air flow from said outside air flow.

33. An air conditioning system for humidity control of a controlled space, comprising,
a means for cooling;
a means for directing an air flow to said means for cooling, and to a bypass to said means for cooling, and to a mixing means for mixing said air flow to said means for cooling and to said bypass, for producing a mixed air flow for a controlled space;
a means for sensing humidity in said controlled space and for providing a humidity signal indicative of the humidity level in said controlled space;
a means for controlling connected to said means for cooling and said means for directing an air flow, and to said means for sensing humidity, for producing an active or inactive humidity control signal in response to a humidity signal indicative of a change in humidity in said controlled space, for controlling said means for directing an air flow; and
said means for directing an air flow, increasing said air flow to said bypass and to said mixing means relative to said air flow to said cooling means, in response to said active humidity control signal.

34. The system of claim 33, wherein, said means for controlling comprises means for producing said active humidity control signal independently of temperature in said controlled space.

35. The system of claim 33, wherein, said means for controlling produces a temperature control signal indicative of temperature in said controlled space relative to a temperature set point, and said means for cooling, cools said air flow, in response to said temperature control signal; and wherein, said active humidity control signal is independent of said temperature control signal and said means for directing an air flow increases said air flow to said bypass and said mixing means, relative to said air flow to said cooling means, in response to said active humidity control signal independently of said temperature control.

36. The system of claim 33, wherein, said active humidity control signal is a proportional signal relative to said humidity signal.

37. The system of claim 33, wherein, said means for directing an air flow, includes means for increasing said air flow to said bypass and to said mixing means from said bypass, relative to said air flow to said cooling means, for reducing the temperature and humidity of said air flow from said bypass.

38. The system of claim 33, wherein, said means for directing an air flow includes means for directing an ambient air flow from said controlled space to said cooling means and an outside air flow to said cooling means and for separating said ambient air flow from said outside air flow.

39. The system of claim 33, wherein said cooling means comprises a high and low pressure circuit; and a liquid suction heat exchanger means for transferring heat from high pressure circuit to said low pressure circuit for heating the refrigerant in said low high pressure circuit;

a thermostatic expansion sensor means for sensing the pressure and temperature, placed in said low pressure circuit; and a thermostatic expansion valve means placed in the high pressure circuit and connected to said thermostatic expansion sensor means for metering the flow rate of said refrigerant into said liquid suction heat exchanger means in response to the refrigerant pressure and the temperature sensed by said thermostatic expansion sensor means.

40. The system of claim 33, wherein said means for cooling includes a temperature sensor means connected to said means for cooling and to said means for controlling for increasing the temperature of said means for cooling in response to an indication of freezing condensate.

41. The system of claim 40, wherein, said thermostatic expansion valve means reduces the flow rate of said refrigerant in response to said thermostatic expansion sensor means indicating a temperature of said refrigerant in said low pressure circuit below that indicative of complete evaporation of said refrigerant.

42. An air conditioning method for humidity control of a controlled space, comprising the steps of, directing an air flow to a heat exchanger for cooling said air flow, and to a bypass to said heat exchanger and to a mixing means for mixing said air flow to said heat exchanger and said bypass, for producing a mixed air flow for a controlled space;

sensing humidity in said controlled space and providing a humidity signal indicative of a humidity level in said controlled space;

producing an active or inactive humidity signal in response to a humidity signal indicative of a change in humidity in said controlled space;

controlling said air flow, in response to said active or inactive humidity signal; and increasing said air flow to said bypass and to said mixing means relative to said air flow to said cooling means, in response to said active humidity signal.

43. The method of claim 42 wherein, said step of controlling comprises the step of producing said active or inactive humidity control signal independently of temperature in said controlled space.

44. The method of claim 42 wherein, said step of controlling comprises the step of producing an active or inactive temperature signal responsive to a change in temperature; and the step of cooling said air flow, in response to said active; and wherein, said step of producing said active or inactive humidity signal, produces said active or inactive humidity signals independent of said temperature signal.

45. The method of claim 42, wherein, said step of producing said active humidity control signal includes the step of producing a proportional signal relative to said humidity signal.

46. The method of claim 42, wherein, said step of directing an air flow, includes the step of increasing said air flow to said bypass, relative to said air flow to said cooling means, for reducing the temperature and the humidity of said air flow from said bypass.

47. The system of claim 42, wherein, said step of directing an air flow includes the step of directing an ambient air flow from said controlled space to said cooling means and an outside air flow to said cooling means and for separating said ambient air flow from said outside air flow.

48. An air conditioning system for humidity control of a controlled space, comprising, a means for cooling;

a means for directing an air flow to said means for cooling, and to a bypass to said means for cooling, and to a mixing means for mixing said air flow from said means for cooling and from said bypass, for producing a mixed air flow for a controlled space;

a means for sensing humidity in a controlled space relative to a humidity setting, for providing an active humidity signal indicative of a humidity level in said controlled space above said humidity setting;

a means for controlling for controlling said means for cooling and said means for directing an air flow;

said means for directing an air flow, increasing said air flow to said bypass relative to said air flow to said cooling means, in response to said active humidity control signal.

49. The air conditioning system of claim 48, wherein, said means for controlling comprises means for deactivating selected portions of said means for cooling; and said means for directing an air flow for directing said air flow through said deactivated cooling means, for bypassing said cooling means and for increasing bypassed airflow to said mixing means.

* * * * *